United States Patent
Hosono et al.

(10) Patent No.: US 11,461,597 B2
(45) Date of Patent: Oct. 4, 2022

(54) OBJECT LIKELIHOOD ESTIMATION DEVICE, METHOD, AND PROGRAM

(71) Applicant: NIPPON TELEGRAPH AND TELEPHONE CORPORATION, Tokyo (JP)

(72) Inventors: Takashi Hosono, Tokyo (JP); Shuhei Tarashima, Tokyo (JP); Jun Shimamura, Tokyo (JP); Tetsuya Kinebuchi, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 21 days.

(21) Appl. No.: 15/733,883

(22) PCT Filed: May 31, 2019

(86) PCT No.: PCT/JP2019/021797
§ 371 (c)(1),
(2) Date: Nov. 30, 2020

(87) PCT Pub. No.: WO2019/230965
PCT Pub. Date: Dec. 5, 2019

(65) Prior Publication Data
US 2021/0216829 A1    Jul. 15, 2021

(30) Foreign Application Priority Data
Jun. 1, 2018   (JP) .............................. JP2018-106240

(51) Int. Cl.
*G06V 10/00*   (2022.01)
*G06K 9/62*    (2022.01)
(Continued)

(52) U.S. Cl.
CPC .............. *G06K 9/6265* (2013.01); *G06T 7/13* (2017.01); *G06V 10/44* (2022.01);
(Continued)

(58) Field of Classification Search
CPC .......... G06K 9/00; G06K 9/202; G06K 9/222; G06K 9/2011; G06K 9/72; G06K 9/48;
(Continued)

(56) References Cited

U.S. PATENT DOCUMENTS 5,719,958 A * 2/1998 Wober ................. H04N 9/0451
375/E7.206
5,827,629 A * 10/1998 Miyatake .................. G03F 9/70
430/30

(Continued)

OTHER PUBLICATIONS

Hosang et al. (2016) "What makes for effective detection proposals?" IEEE Trans. on Pattern Analysis and Machine Intelligence, vol. 38, No. 4, 16 pages.

(Continued)

*Primary Examiner* — Amir Alavi

(57) ABSTRACT

Objectness indicating a degree of accuracy of a single object is accurately estimated. An edge detection unit 30 detects an edge for a depth image, an edge density/uniformity calculation unit 40 calculates an edge density on the periphery of a candidate region, an edge density inside the candidate region, and edge uniformity on the periphery of the candidate region. An objectness calculation unit 42 calculates the objectness of the candidate region based on the edge density on the periphery of the candidate region, the edge density inside the candidate region, and the edge uniformity on the periphery of the candidate region.

20 Claims, 9 Drawing Sheets

(51) Int. Cl.
G06T 7/13 (2017.01)
G06V 10/44 (2022.01)

(52) U.S. Cl.
CPC .............. *G06T 2207/10028* (2013.01); *G06T 2207/30242* (2013.01); *G06V 2201/07* (2022.01)

(58) Field of Classification Search
CPC .. G06K 9/6407; G06K 9/2009; G06K 9/6423; G06K 9/6476; G06K 9/00084; G06K 9/6265; G06K 9/4604; G06T 7/0083; G06T 7/0081; G06T 7/0085; G06T 7/001; G06T 7/13; G06T 5/001; G06T 2207/10016; G06T 2207/30242; G06T 2207/10028; G06T 2207/21; G06F 17/30249
See application file for complete search history.

(56) References Cited

U.S. PATENT DOCUMENTS

| | | | | |
|---|---|---|---|---|
| 7,697,786 B2* | 4/2010 | Camus | ................ | G06V 10/255 |
| | | | | 382/104 |
| 7,720,302 B2* | 5/2010 | Aoyama | ............ | H04N 5/23254 |
| | | | | 382/199 |
| 8,155,386 B2* | 4/2012 | Sim | ........................... | G06T 7/50 |
| | | | | 382/173 |
| 8,184,196 B2* | 5/2012 | Forutanpour | ........... | G06T 7/564 |
| | | | | 348/625 |
| 8,514,269 B2* | 8/2013 | Adler | ..................... | G06T 5/002 |
| | | | | 348/51 |
| 8,553,942 B2* | 10/2013 | Lynch | ..................... | G01C 3/00 |
| | | | | 382/106 |
| 8,823,745 B2* | 9/2014 | Francois | ............... | A63F 13/213 |
| | | | | 345/638 |
| 8,891,905 B2* | 11/2014 | Cui | ........................ | G06T 3/4053 |
| | | | | 382/299 |
| 2003/0076317 A1* | 4/2003 | Lee | ........................ | G06T 17/00 |
| | | | | 345/419 |
| 2021/0216829 A1* | 7/2021 | Hosono | ................ | G06V 10/507 |

OTHER PUBLICATIONS

He et al. (2015) "Spatial Pyramid Pooling in Deep Convolutional Networks for Visual Recognition" ECCV, pp. 1-14.
Zitnick et al. (2014) "Edge Boxes: Locating Object Proposals from Edges" ECCV, vol. 8693, pp. 391-405.
Alexe et al. (2010) "What is an object?" 2010 IEEE Conference on Computer Vision and Pattern Recognition (CVPR), San Francisco, CA, 2010 pp. 73-80.
Liu et al. (2016) "Depth-Aware Layered Edge for Object Proposal" 2016 IEEE International Conference on Multimedia and Expo (ICME), Seattle, WA, USA, pp. 1-6.
Hosono et al. (2017) "Object Proposal for Multiple Objects Using Depth Boundary" 3D-Conf, 2 pages.
Xu et al. (2015) "Adaptive in Tegration of Depth Andcolor for Objectness Estimation" 2015 IEEE International Conference on Multimedia and Expo (ICME), Turin, Italy, 2015 pp. 1-6.

\* cited by examiner

OBJECT LIKELIHOOD ESTIMATION DEVICE, METHOD, AND PROGRAM

CROSS-REFERENCE TO RELATED APPLICATIONS

This application is a U.S. 371 Application of International Patent Application No. PCT/JP2019/021797, filed on 31 May 2019, which application claims priority to and the benefit of JP Application No. 2018-106240, filed on 1 Jun. 2018, the disclosures of which are hereby incorporated herein by reference in their entireties.

TECHNICAL FIELD

The present invention relates to an objectness estimation apparatus, a method, and a program and particularly relates to an objectness estimation apparatus, a method, and a program for estimating the objectness of a candidate region in an image.

BACKGROUND ART

Objectness estimation is a technique of estimating whether or not a region in an inputted image adequately includes a single object. Objectness estimation is widely used as the core of a technique for estimating an object candidate region, in which a candidate region including a single object is estimated in an image (NPL 1).

The technique for estimating an object candidate region is a technique used as the preprocessing of object detection for estimating the kind and position of an object in an image. For example, in NPL 2, an object is detected in a framework where the object is recognized (the kind of the object is estimated) for each candidate region estimated by estimation of an object candidate region. According to the technique, the detection of an object from a camera installed in a smartphone or a robot may remarkably contribute to the implementation of a system for intuitively presenting information to a user according to the kind or position of an object and identifying surrounding environments by means of a robot.

In the estimation of an object candidate region according to objectness estimation, generally, objectness is calculated for each region (rectangle) cut from an image by a sliding window or the like, and then some regions are outputted as candidate regions in descending order of objectness (see FIG. 8). At this point, if high objectness is calculated in a region including an inaccurately captured object, it is necessary to output many unnecessary candidate regions including inaccurately captured objects in order to cover objects in an image. Estimation of unnecessary candidate regions may increase the calculation cost of object detection with the number of times of object recognition in subsequent steps or cause erroneous recognition or lack of recognition when a region not including an object (including a background irrelevant to an object or other objects). In view of objectness in regions cut from an overall image, it is necessary to quickly calculate objectness in order to seamlessly present information or identify surrounding environments through object detection. Therefore, objectness estimation requires accurate and quick calculation of whether a single object is adequately included or not. Furthermore, in consideration of an unknown object (e.g., an obstacle) handled by the system of a robot or the like, objectness estimation is desirably an algorithm that does not require learning data (a target object is not always included in teacher data).

CITATION LIST

Non Patent Literature

[NPL 1] J. Hosang, et al., "What Makes for Effective Detection Proposals?", IEEE Trans. on Pattern Analysis and Machine Intelligence, vol. 38, no. 4, 2016.
[NPL 2] K. He, et al., "Spatial Pyramid Pooling in Deep Convolutional Networks for Visual Recognition", in ECCV, 2014.
[NPL 3] C. L. Zitnick, et al., "Edge boxes: locating object proposals from edges", in ECCV, 2014.
[NPL 4] B. Alexe, et al., "What is an object?", in CVPR, 2010.
[NPL 5] J. Liu, et al., "Depth-aware layered edge for object proposal", in ICME, 2016.
[NPL 6] Hosono, et al., "Object Proposal from Image of Multiple Objects using Depth Boundaries", in 3D Image Conference, 2017.
[NPL 7] X. Xu, et al., "Adaptive integration of depth and color for objectness estimation", in ICME, 2014.

SUMMARY OF THE INVENTION

Technical Problem

In a known advanced method of objectness estimation, in particular, objectness is estimated based on information on an image boundary obtained by edge detection or super-pixel division on a visible light image. For example, NPL 3 proposes a method of calculating objectness on the assumption that a region including an accurately captured object "hardly crosses an image boundary obtained by grouping detected edges". In NPL 4, an index of objectness is used such that objectness increases as a region crossing a super pixel is reduced. This method suggests that many image boundaries are obtained for "boundaries between objects" (object boundaries). However, image boundaries obtained by the method include boundaries formed from object patterns as well as boundaries between objects. Typically, it is not easy to discriminate between boundaries between objects and boundaries formed from patterns in a visible light image. The known method does not include such a mechanism and thus objectness may increase in a region including boundaries formed from patterns, that is, a region including inadequately captured objects.

As an approach to the problem, an imaging method for capturing an image may be used to react to a change of a boundary between objects without depending upon a change of patterns. For example, using a depth sensor is likely to cause a large depth difference between objects but cause no depth difference or only a small depth difference in objects. Thus, an edge detected from a depth image may be used for the known methods (NPL 3, NPL 4) so as to estimate objectness with higher accuracy. Also in this case, however, high objectness may be estimated in a region including an inaccurately captured object. This is because the index for determining a region including an accurately captured object is established also in a region including multiple objects. The index determines that the smaller the region crossing an image boundary, the more accurate the captured object.

Moreover, an objectness estimation method using a dept image is available. For example, in the method of NPL 5, an image is divided into multiple layers according to the depth and the calculation results of objectness in the layers are combined, thereby suppressing the occurrence of a region including multiple objects at considerably different distances. However, objectness is calculated by using only an edge detected from a visible light image, so that objectness increases in a region including multiple objects as long as multiple objects are included in the same layer. In NPL 6, objectness is estimated on the assumption that a region adequately including a single object includes many edges (depth edges), which are detected from a depth image, on the periphery of the region and the depth edges are not included at the center of the region. However, even if the assumption is satisfied, depth edges extracted from another object adjacent to the periphery of the region can be captured as illustrated in FIG. 9. This may increase the objectness of a region including a part of another object. NPL 7 proposes a method of learning objectness by using gradient information that is calculated from a visible light image and a depth image. Objectness may not be accurately estimated in an image including an object or a scene that is not included in learning data. As described above, unfortunately, the method using a depth image increases objectness in a region including inadequately captured objects or depends on the presence of learning data.

The present invention has been devised in view of the problem. An object of the present invention is to provide an objectness estimation apparatus, a method, and a program that can accurately estimate the objectness of a candidate region.

Means for Solving the Problem

An objectness estimation apparatus for estimating objectness indicating a degree of accuracy of a single object in a candidate region that is a candidate of a region including the object in an inputted depth image, the objectness estimation apparatus including: an edge detection unit that performs edge detection for detecting an edge of the depth image; an edge density/uniformity calculation unit that calculates an edge density on the periphery of the candidate region, an edge density inside the candidate region, and edge uniformity on the periphery of the candidate region based on the edge detected by the edge detection unit; and an objectness calculation unit that calculates the objectness of the candidate region based on the edge density on the periphery of the candidate region, the edge density inside the candidate region, and the edge uniformity on the periphery of the candidate region, the edge densities and uniformity being calculated by the edge density/uniformity calculation unit.

An objectness estimation method in an objectness estimation apparatus for estimating objectness indicating a degree of accuracy of a single object in a candidate region that is a candidate of a region including the object in an inputted depth image, the method including: detecting an edge of the depth image by an edge detection unit; calculating an edge density on the periphery of the candidate region, an edge density inside the candidate region, and edge uniformity on the periphery of the candidate region by an edge density/uniformity calculation unit based on the edge detected by the edge detection unit; and calculating the objectness of the candidate region by an objectness calculation unit based on the edge density on the periphery of the candidate region, the edge density inside the candidate region, and the edge uniformity on the periphery of the candidate region, the edge densities and uniformity being calculated by the edge density/uniformity calculation unit.

A program according to the present invention is a program for enabling a computer to act as the units of the objectness estimation apparatus.

Effects of the Invention

The objectness estimation apparatus, a method, and a program according to the present invention calculates the objectness of the candidate region based on an edge density on the periphery of the candidate region, an edge density inside the candidate region, and edge uniformity on the periphery of the candidate region, so that the objectness indicating the degree of accuracy of a single object can be accurately estimated.

DESCRIPTION OF EMBODIMENTS

Embodiments of the present invention will be described below in accordance with the accompanying drawings.

<The Outline of the Embodiments of the Present Invention>

Figure 1:
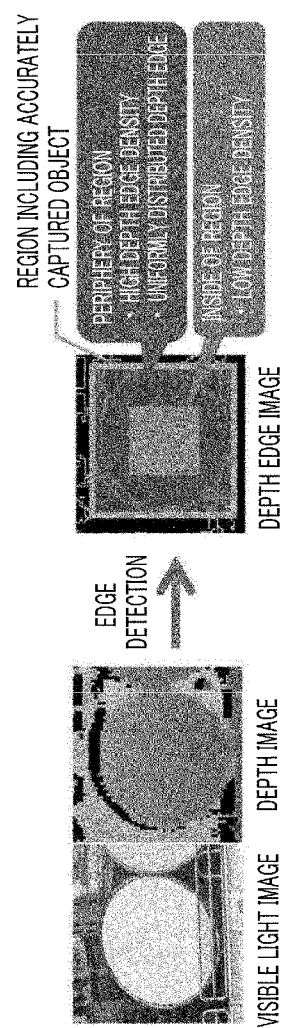
FIG. 1 illustrates the outline of processing of an objectness estimation apparatus according to the present invention.

In the embodiments of the present invention, an objectness estimation apparatus using a depth image will be described. The objectness estimation apparatus can quickly estimate objectness without using learning data such that the objectness increases only when a single object is adequately included. It is assumed that a region adequately including a single object is a region circumscribing an object boundary. In NPL 6, such a region is defined as a region having a high depth-edge density on the periphery of the region and a low depth-edge density at the center of the region and objectness is estimated based on an edge density. In this method, as described above, high objectness may be estimated in a region including a part of another object. In the embodiments of the present invention, objectness is defined on the assumption that an object boundary detected from a single object typically forms a closed loop and thus a region circumscribing the object boundary includes evenly distributed depth edges as well as many depth edges on the periphery of the region (FIG. 1). The present invention is aimed at increasing objectness only when a region adequately includes a single object. The uniformity of the depth edges is calculated based on the dispersion of depth edge densities in the split regions of the periphery of the region. The edge density of a region can be quickly calculated by using an integral image. Thus, according to a method of estimating objectness based on the edge density and uniformity of a region according to the present embodiment, the objectness can be quickly estimated.

Furthermore, based on a rough shape of a region obtained from a depth image, means for cancelling calculation of objectness is provided for a region not including an overall object (a recessed or flat region), thereby more quickly estimating objectness.

First Embodiment

<The Configuration of an Objectness Estimation Apparatus According to a First Embodiment of the Present Invention>

Figure 2:
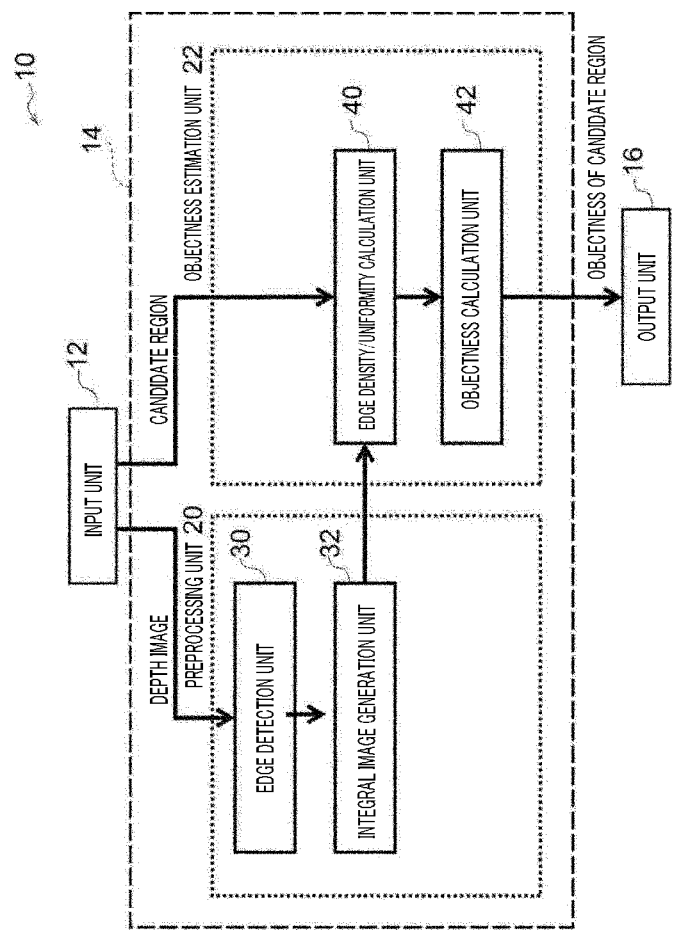
FIG. 2 is a block diagram illustrating the configuration of the objectness estimation apparatus according to the first embodiment of the present invention.

The configuration of the objectness estimation apparatus according to the first embodiment of the present invention will be described below. FIG. 2 is a block diagram illustrating the configuration of the objectness estimation apparatus according to the first embodiment.

An objectness estimation apparatus 10 according to the first embodiment includes an input unit 12, a computing unit 14, and an output unit 16.

The input unit 12 receives, as inputs, a depth image including a region where objectness is to be calculated and a candidate region (rectangle) that is a candidate of a region including an object.

The computing unit 14 includes a computer provided with a CPU, RAM, and ROM for storing a program for executing an objectness estimation routine, which will be described later. The function of the computing unit 14 is configured as will be described below. The computing unit 14 includes a preprocessing unit 20 and an objectness estimation unit 22.

The preprocessing unit 20 receives a depth image including a region where objectness is to be calculated. The preprocessing unit 20 includes an edge detection unit 30 that detects the edge of the inputted depth image and an integral image generation unit 32 that generates an integral image of a depth edge image. With the generation of an integral image, fast calculation of objectness is expected for any region in the depth image inputted to the preprocessing unit 20.

The objectness estimation unit 22 includes an edge density/uniformity calculation unit 40 that calculates an edge density and uniformity by using the integral image generated by the preprocessing unit 20 and an objectness calculation unit 42 that outputs objectness for the inputted candidate region by combining the scores of the edge density and uniformity.

Processing performed in the units will be specifically described below.

The edge detection unit 30 generates the depth edge image by detecting the edge of the inputted depth image (for example, see Reference 1). If the depth image includes a missing value, a depth edge may be detected from a missing region. Thus, the missing value may be interpolated in advance by a nearest non-missing value.

The integral image generation unit 32 generates the integral image of the depth edge image by using means described in Reference 2. Specifically, a pixel value S(u,v) at a position (u,v) of an integral image S is defined by the following formula:

$$S(u, v) = \sum_{i=0}^{i \leq u} \sum_{j=0}^{j \leq v} E(i, j) \qquad \text{[Formula 1]}$$

where E(i, j) indicates the pixel value (edge likelihood) of a position (i, j) of an inputted edge image E.

For the inputted candidate region, the edge density/uniformity calculation unit 40 calculates depth edge densities on the periphery and inside of the region and edge uniformity on the periphery of the region. The periphery and inside of the region are set based on the height and width of the region. For example, when a rectangle obtained by multiplying the height and width of the region by a times ($0<\alpha<1$) is disposed at the center of the candidate region, the region of the rectangle may be set as the inside and the other region may be set as the periphery. For example, an edge density $\varphi$ for a rectangular region b may be calculated by the following formula:

$$\phi(b) = \frac{\sum_{(p,q) \in b} E(p, q)}{2(b_w + b_h)^\kappa} \qquad \text{[Formula 2]}$$

where bw and bh indicate the height and width of the rectangular region and $(p, q) \in b$ indicates a pixel position in the rectangular region. Moreover, x indicates a parameter for adjusting the degree of normalization according to the size of the rectangle. In the example, the sum of edge likelihoods in the rectangular region is normalized by the circumference of the rectangular region. The circumference may be replaced with the area of the rectangular region. The sum of the pixel values of an edge image in the rectangular region is expressed as follows:

$$\Sigma_{(p,q) \in b} E(p,q)$$

Figure 3:
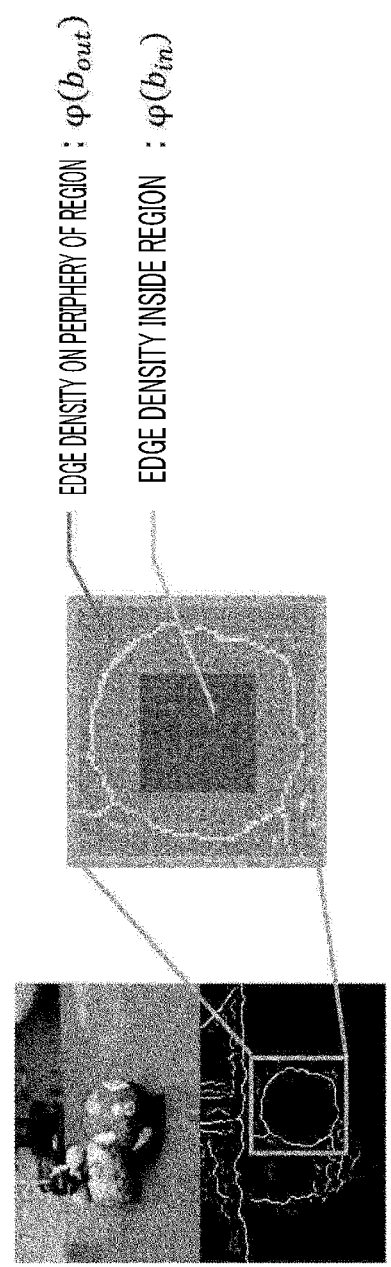
FIG. 3 is an explanatory drawing illustrating a method of calculating an edge density.

The sum of pixel values can be quickly calculated, as expressed by the following formula, by using an integral image without referring to all pixel values in the rectangular region.

$$\Sigma_{(p,q) \in b} E(p,q) = S(b_r, b_u) - S(b_r, b_l) - S(b_l, b_u) + S(b_l, b_l) \qquad \text{[Formula 3]}$$

where $b_t$, $b_u$, $b_l$, and $b_r$ indicate the y coordinate of the upper side, the y coordinate of the lower side, the x coordinate of the left side, and the x coordinate of the right side of the rectangular region. According to the means, edge densities $\varphi(b_{out})$ and $\varphi(b_{in})$ of a periphery $b_{out}$ and an inside $b_{in}$ of the region are calculated. At this point, the periphery and inside of the region are divided as illustrated in FIG. 3.

Figure 4:
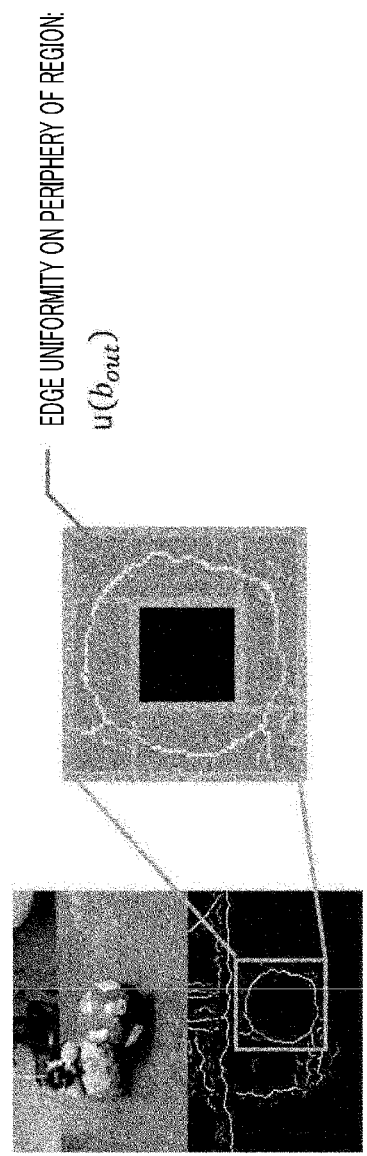
FIG. 4 is an explanatory drawing illustrating a method of calculating edge uniformity.

As illustrated in FIG. 4, edge uniformity on the periphery of the region is defined by the dispersion of edge densities on the periphery of the region, the periphery being divided into K portions. For example, edge uniformity $u(b_{out})$ is calculated according to the following formula:

$$u(b_{out}) = -\frac{1}{K} \sum_{k=1}^{K} (\phi(b_{out}^j) - \overline{\phi(b_{out})})^2 \qquad \text{[Formula 4]}$$

where $b_{out}^i$ indicates each region of divided $b_{out}$.

$\overline{\phi(b_{out})}$ indicates the mean edge density of separate regions.

The objectness calculation unit 42 calculates objectness by using depth edge densities $\varphi(b_{out})$ and $\varphi(b_{in})$ on the periphery and inside of the region and depth edge uniformity $u(b_{out})$ on the periphery of the region such that the objectness increases as the edge density increases on the periphery of the region and the edge density decreases inside the region, and the objectness increases with edge uniformity on the periphery of the region. The depth edge densities and uniformity are calculated by the edge density/uniformity calculation unit 40. For example, scores calculated from the edge densities and the edge uniformity are combined by weight w as expressed in the following formula, so that objectness S(b) is calculated for a rectangular region b, which is a candidate region. The objectness is then outputted by the output unit 16.

$$S(b) = \frac{\varsigma(\phi(b_{out}))}{\varsigma(\phi(b_{in}))} + w \cdot u(b_{out}) \qquad \text{[Formula 5]}$$

where $\varsigma(\cdot)$ is a standard sigmoid function that is calculated by the following formula:

$$\varsigma(x) = \frac{1}{1+e^{-x}}.$$

[Reference 1] P. Doll'ar and C. L. Zitnick, Structured forests for fast edge detection, in ICCV, 2013.
[Reference 2] F. C. Crow, Summed-area tables for texture mapping, in SIGGRAPH, 1984.

<The Operations of the Objectness Estimation Apparatus According to the First Embodiment of the Present Invention>

The operations of the objectness estimation apparatus 10 according to the first embodiment of the present invention will be described below.

Figure 5:
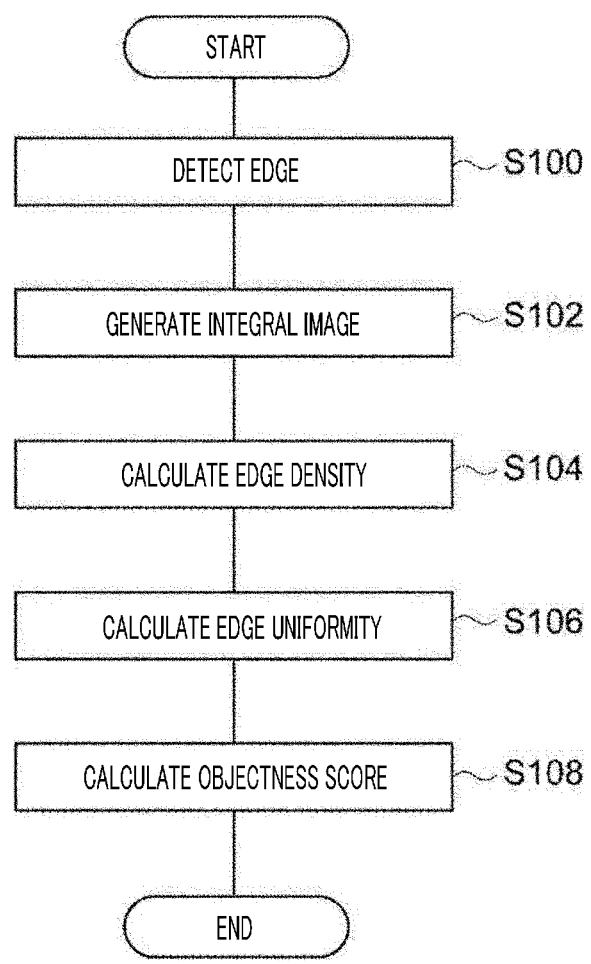
FIG. 5 is a flowchart showing the objectness estimation routine of the objectness estimation apparatus according to the first embodiment of the present invention.

FIG. 5 is a flowchart showing the objectness estimation routine of the objectness estimation apparatus 10 according to the first embodiment.

In response to the input of a depth image including a region where objectness is to be calculated and a candidate region (rectangle) where objectness is to be calculated, the computing unit 14 performs the objectness estimation routine indicated in FIG. 5.

First, in step S100, the edge detection unit 30 generates the depth edge image by detecting the edge of the inputted depth image.

In step S102, the integral image generation unit 32 generates the integral image of the depth edge image.

In step S104, for the inputted candidate region, the edge density/uniformity calculation unit 40 calculates depth edge densities on the periphery and inside of the region.

In step S106, for the inputted candidate region, the edge density/uniformity calculation unit 40 calculates edge uniformity on the periphery of the region.

In step S108, the objectness calculation unit 42 calculates the objectness of a candidate region by using depth edge densities $\varphi(b_{out})$ and $\varphi(b_{in})$ on the periphery and inside of the region and depth edge uniformity $u(b_{out})$ on the periphery of the region. The depth edge densities and uniformity are calculated by the edge density/uniformity calculation unit 40. The objectness is then outputted by the output unit 16, completing the objectness estimation routine.

As described above, the objectness estimation apparatus according to the first embodiment calculates the objectness of a candidate region based on an edge density on the periphery of the candidate region, an edge density inside the candidate region, and edge uniformity on the periphery of the candidate region, so that the objectness indicating the degree of accuracy of a single object can be accurately estimated without using learning data.

Furthermore, the objectness estimation apparatus according to the first embodiment generates the integral image of a depth edge image, thereby quickly estimating objectness such that the objectness increases only when a single object is adequately included.

Second Embodiment

A second embodiment of the present invention will be described below. The same configurations as those of the first embodiment are indicated by the same reference numerals and an explanation thereof is omitted.

The second embodiment is different from the first embodiment in that a shape determination unit is added.

<The Outline of the Second Embodiment>

In the second embodiment, whether objectness is to be subsequently estimated or not is determined by rough shapes (unevenness or the like) estimated based on depth information in a region. This can omit calculation of objectness for a region typically shaped without including an overall object (a recessed shape), thereby more quickly estimating objectness.

<The Configuration of the Objectness Estimation Apparatus According to the Second Embodiment of the Present Invention>

Figure 6:
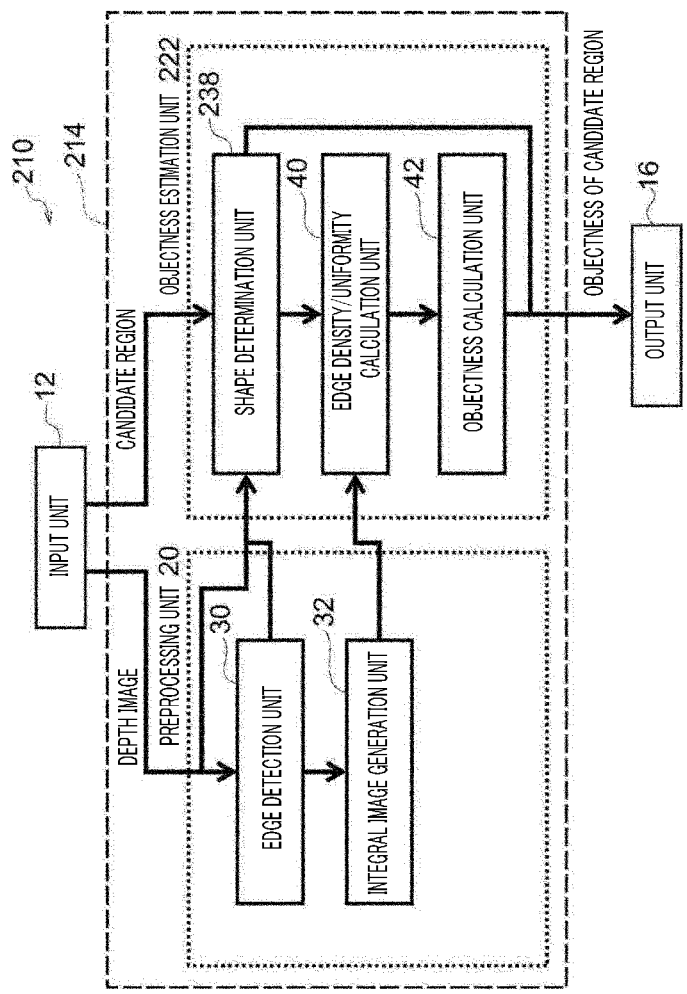
FIG. 6 is a block diagram illustrating the configuration of an objectness estimation apparatus according to a second embodiment of the present invention.

As illustrated in FIG. 6, a computing unit 214 of an objectness estimation apparatus 210 according to the second embodiment includes a preprocessing unit 20 and an objectness estimation unit 222. The objectness estimation unit 222 includes a shape determination unit 238, an edge density/uniformity calculation unit 40, and an objectness calculation unit 42. The shape determination unit 238 determines whether to calculate an edge density and uniformity by the edge density/uniformity calculation unit 40 and whether to calculate objectness by the objectness calculation unit 42, according to rough shapes estimated from depth information on a candidate region.

The shape determination unit 238 estimates rough shapes from the depth information (including a depth image and a depth edge image) in the candidate region (rectangle). For a shape not including an overall object, subsequent calculation of an edge density and uniformity by the edge density/uniformity calculation unit 40 and calculation of objectness by the objectness calculation unit 42 are cancelled. Thus, objectness is efficiently estimated. Shapes to be determined include, for example, unevenness in the region. An ordinary object has a convex shape. Thus, if a mean depth on the periphery of a candidate region exceeds a mean depth inside the candidate region by at least a certain degree, the shape determination unit 238 determines that the region is recessed and cancels subsequent calculation of an edge density and uniformity by the edge density/uniformity calculation unit 40 and calculation of objectness by the objectness calculation unit 42. If a candidate region includes only a small number of depth edges, it is assumed that the region includes only a part of a flat object, e.g., a wall or a ground. Hence, even if the sum of depth edges in the candidate region is at most a certain number, the shape determination unit 238 cancels subsequent calculation of an edge density and uniformity by the edge density/uniformity calculation unit 40 and calculation of objectness by the objectness calculation unit 42.

<The Operations of the Objectness Estimation Apparatus According to the Second Embodiment of the Present Invention>

Figure 7:
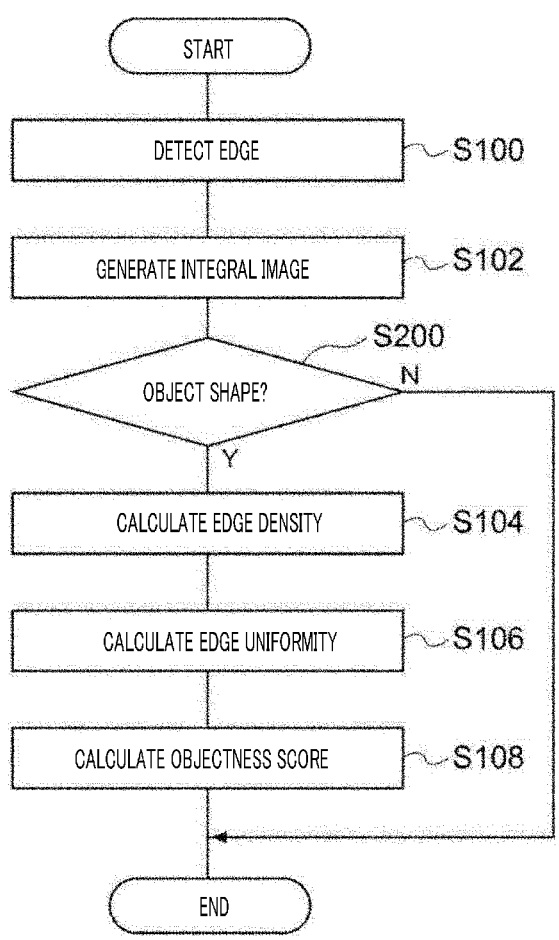
FIG. 7 is a flowchart showing the objectness estimation routine of the objectness estimation apparatus according to the first embodiment of the present invention.
Figure 8:
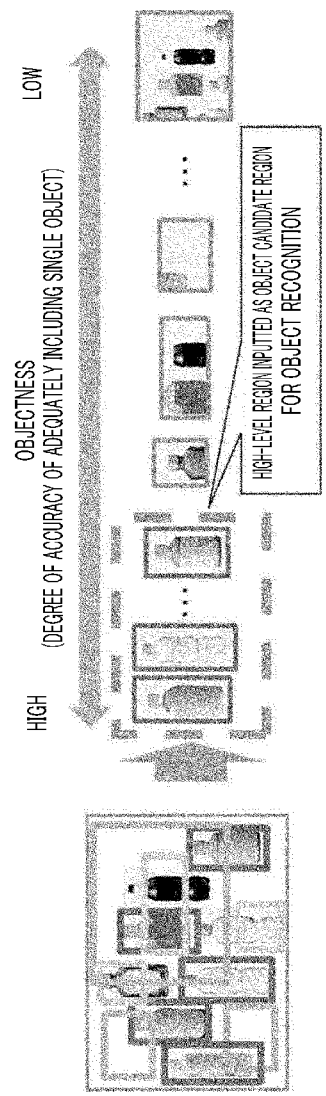
FIG. 8 illustrates an example of conventional objectness estimation.
Figure 9:
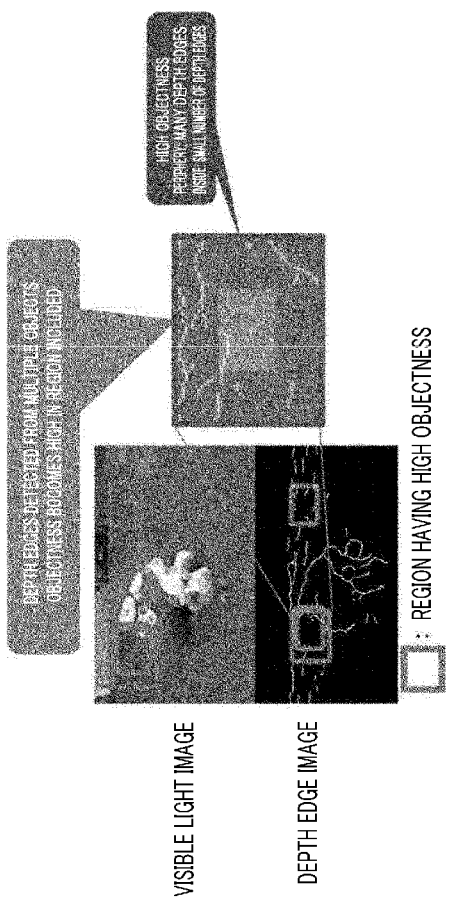
FIG. 9 illustrates a failure of the conventional objectness estimation.

FIG. 7 is a flowchart showing the objectness estimation routine of the objectness estimation apparatus 210 according to the second embodiment. In the objectness estimation of the second embodiment, the same processing as the objectness estimation of the first embodiment is indicated by the same reference numerals and a detailed explanation thereof is omitted.

First, in step S100, an edge detection unit 30 generates a depth edge image by detecting the edge of an inputted depth image.

In step S102, an integral image generation unit 32 generates the integral image of the depth edge image.

In step S200, based on the depth edge image and the integral image of the depth edge image, the shape determination unit 238 determines whether a mean depth inside the candidate region exceeds a mean depth on the periphery of the candidate region by at least a certain degree or whether the number of edges extracted from the candidate region of the depth image is at most a certain number.

If the shape determination unit 238 determines that a mean depth inside the candidate region exceeds a mean depth on the periphery of the candidate region by at least the certain degree or the number of edges extracted from the candidate region of the depth image is at most the certain number, it is assumed that an object is not entirely captured. The shape determination unit 238 determines that subsequent processing is to be cancelled and terminates the objectness estimation routine.

If the shape determination unit 238 determines that a mean depth inside the candidate region does not exceed a mean depth on the periphery of the candidate region by at least the certain degree or the number of edges extracted from the candidate region of the depth image is larger than the certain number, the shape determination unit 238 determines that the subsequent processing is to be performed. The process advances to step S104.

In step S104, for the inputted candidate region, the edge density/uniformity calculation unit 40 calculates depth edge densities on the periphery and inside of the region.

In step S106, for the inputted candidate region, the edge density/uniformity calculation unit 40 calculates edge uniformity on the periphery of the region.

In step S108, the objectness calculation unit 42 calculates the objectness of the candidate region by using depth edge densities $\varphi(b_{out})$ and $\varphi(b_{in})$ on the periphery and inside of the region and depth edge uniformity $u(b_{out})$ on the periphery of the region. The depth edge densities and uniformity are calculated by the edge density/uniformity calculation unit 40. The objectness is then outputted by the output unit 16, completing the objectness estimation routine.

As described above, the objectness estimation apparatus according to the second embodiment determines whether to cancel the subsequent processing according to the rough shape of the candidate region. This can more quickly estimate objectness such that the objectness increases only when a single object is adequately included.

The present invention is not limited to the foregoing embodiments and can be modified or applied in various ways within the scope of the present invention.

For example, the received input is, but is not limited to, a candidate region. A region cut by a sliding window or the like may be set as a candidate region.

In the present specification, the program is preinstalled in the embodiments. The provided program may be stored in a computer-readable recording medium.

REFERENCE SIGNS LIST 10, 210 Objectness estimation apparatus
12 Input unit
14, 214 Computing unit
16 Output unit
20 Preprocessing unit
22, 222 Objectness estimation apparatus
30 Edge detection unit
32 Integral image generation unit
40 Edge density/Uniformity calculation unit
42 Objectness calculation unit
238 Shape determination unit

The invention claimed is:

1. An object likelihood estimation device for estimating object likelihood indicating a degree of accuracy of a single object in a candidate region that is a candidate of a region including images of objects in an inputted depth image, the object likelihood estimation device comprising:
   a processor; and
   a memory storing computer-executable instructions including:
      an edge detector configured to detect an edge of the depth image;
      an edge density/uniformity determiner configured to determine:
         an edge density on a periphery of the candidate region,
         an edge density inside the candidate region, and
         edge uniformity on the periphery of the candidate region based on the edge detected by the edge detector; and
      an object likelihood determiner configured to determine the object likelihood of the candidate region based on the edge density on the periphery of the candidate region, the edge density inside the candidate region, and the edge uniformity on the periphery of the candidate region, the edge densities and uniformity being calculated by the edge density/uniformity determiner.

2. The object likelihood estimation device according to claim 1, the computer-executable instructions further comprising:
   an integral generator configured to generate an integral image of an edge image based on the edge detected by the edge detector, wherein the edge density/uniformity determiner determines the edge density on the periphery of the candidate region, the edge density inside the candidate region, and the edge uniformity on the periphery of the candidate region based on the integral image.

3. The object likelihood estimation device according to claim 2, the computer-executable instructions further comprising:
   a shape determiner configured to determine whether to perform determination by the edge density/uniformity determiner and whether to perform determination by the object likelihood determiner, according to a rough shape estimated from depth information on the candidate region.

4. The object likelihood estimation device according to claim 1, the computer-executable instructions further comprising:
   a shape determiner configured to determine whether to perform determination by the edge density/uniformity determiner and whether to perform determination by the object likelihood determiner, according to a rough shape estimated from depth information on the candidate region.

5. The object likelihood estimation device according to claim 4, wherein the shape determiner determines that the determination by the edge density/uniformity determiner and the determination by the object likelihood determiner are not to be performed if a mean depth inside the candidate region exceeds a mean depth on the periphery of the candidate region by at least a predetermined degree or the number of edges extracted from the candidate region of the depth image is at most a predetermined number.

6. The object likelihood estimation device according to any one of claim 1, wherein the edge density/uniformity determiner determines an edge density on the periphery of the candidate region and an edge density inside the candidate region, and the edge density/uniformity determiner determines the edge uniformity based on dispersion of edge densities in any number of split regions of the periphery of the candidate region.

7. The object likelihood estimation device according to any one of claim 1, wherein the object likelihood determiner determines object likelihood such that the object likelihood increases as an edge density on the periphery of the candidate region increases and an edge density inside the candidate region decreases, and the object likelihood increases as edge uniformity on the periphery of the candidate region increases.

8. A computer-implemented method for estimating object likelihood indicating a degree of accuracy of a single object in a candidate region that is a candidate of a region including images of objects in an inputted depth image, the method comprising:
   detecting, an edge detector, an edge of the depth image;
   determining, by the edge density/uniformity determiner, one or more of:
     an edge density on a periphery of the candidate region,
     an edge density inside the candidate region, and
     edge uniformity on the periphery of the candidate region based on the edge detected by the edge detector; and
   determining, the object likelihood determiner, the object likelihood of the candidate region based on the edge density on the periphery of the candidate region, the edge density inside the candidate region, and the edge uniformity on the periphery of the candidate region.

9. The computer-implemented method of claim 8, the method further comprising:
   generating an integral image of an edge image based on the edge detected by the edge detector, wherein the edge density/uniformity determiner determines the edge density on the periphery of the candidate region, the edge density inside the candidate region, and the edge uniformity on the periphery of the candidate region based on the integral image.

10. The computer-implemented method of claim 9, the method further comprising:
    determining, by the shape determiner, whether to perform the determination by the edge density/uniformity determiner and whether to perform determination by the object likelihood determiner, according to a rough shape estimated from depth information on the candidate region.

11. The computer-implemented method of claim 8, the method further comprising:
    determining, by the shape determiner, whether to perform the determination by the edge density/uniformity determiner and whether to perform determination by the object likelihood determiner, according to a rough shape estimated from depth information on the candidate region.

12. The computer-implemented method of claim 11, wherein the shape determiner determines that the determination by the edge density/uniformity determiner and the determination by the object likelihood determiner are not to be performed if a mean depth inside the candidate region exceeds a mean depth on the periphery of the candidate region by at least a predetermined degree or the number of edges extracted from the candidate region of the depth image is at most a predetermined number.

13. The computer-implemented method of claim 8, wherein the edge density/uniformity determiner determines an edge density on the periphery of the candidate region and an edge density inside the candidate region, and the edge density/uniformity determiner determines the edge uniformity based on dispersion of edge densities in any number of split regions of the periphery of the candidate region.

14. The computer-implemented method of claim 8, wherein the object likelihood determiner determines object likelihood such that the object likelihood increases as an edge density on the periphery of the candidate region increases and an edge density inside the candidate region decreases, and the object likelihood increases as edge uniformity on the periphery of the candidate region increases.

15. A system for estimating object likelihood indicating a degree of accuracy of a single object in a candidate region that is a candidate of a region including images of objects in an inputted depth image, the system comprises:
    a processor; and
    a memory storing computer-executable instructions that when executed by the processor cause the system to:
    detect, an edge detector, an edge of the depth image;
    determine, by the edge density/uniformity determiner, one or more of:
      an edge density on a periphery of the candidate region,
      an edge density inside the candidate region, and
      edge uniformity on the periphery of the candidate region based on the edge detected by the edge detector; and
    determine, the object likelihood determiner, the object likelihood of the candidate region based on the edge density on the periphery of the candidate region, the edge density inside the candidate region, and the edge uniformity on the periphery of the candidate region.

16. The system of claim 15, the computer-executable instructions when executed further causing the system to:
    generate an integral image of an edge image based on the edge detected by the edge detector, wherein the edge density/uniformity determiner determines the edge density on the periphery of the candidate region, the edge density inside the candidate region, and the edge uniformity on the periphery of the candidate region based on the integral image.

17. The system of claim 15, the computer-executable instructions when executed further causing the system to:
    determine, by the shape determiner, whether to perform the determination by the edge density/uniformity determiner and whether to perform determination by the object likelihood determiner, according to a rough shape estimated from depth information on the candidate region.

18. The system of claim 17, wherein the shape determiner determines that the determination by the edge density/uniformity determiner and the determination by the object likelihood determiner are not to be performed if a mean depth inside the candidate region exceeds a mean depth on the periphery of the candidate region by at least a predetermined degree or the number of edges extracted from the candidate region of the depth image is at most a predetermined number.

19. The system of claim 15, wherein the edge density/uniformity determiner determines an edge density on the periphery of the candidate region and an edge density inside the candidate region, and the edge density/uniformity determiner determines the edge uniformity based on dispersion of edge densities in any number of split regions of the periphery of the candidate region.

20. The system of claim 15, wherein the object likelihood determiner determines object likelihood such that the object likelihood increases as an edge density on the periphery of the candidate region increases and an edge density inside the candidate region decreases, and the object likelihood increases as edge uniformity on the periphery of the candidate region increases.

* * * * *